United States Patent [19]
Hisanaga et al.

[11] Patent Number: 5,761,522
[45] Date of Patent: Jun. 2, 1998

[54] PROGRAM CONTROL SYSTEM PROGRAMMABLE TO SELECTIVELY EXECUTE A PLURALITY OF PROGRAMS

[75] Inventors: Takanori Hisanaga; Fumiyoshi Kawase; Koh Kamizawa, all of Nakai-machi, Japan

[73] Assignee: Fuji Xerox Co., Ltd., Tokyo, Japan

[21] Appl. No.: 634,732

[22] Filed: Apr. 18, 1996

[30] Foreign Application Priority Data

May 24, 1995  [JP]  Japan .................................. 7-125355

[51] Int. Cl.⁶ .................................................. G06F 9/00
[52] U.S. Cl. .................... 395/800.01; 395/677; 395/561; 395/557
[58] Field of Search ........................... 395/800.01, 384, 395/677, 561, 557

[56] References Cited

U.S. PATENT DOCUMENTS

| | | | |
|---|---|---|---|
| 3,705,389 | 12/1972 | Krock et al. | 340/172.5 |
| 5,317,745 | 5/1994 | Chan | 395/700 |
| 5,630,130 | 5/1997 | Perotto et al. | 395/677 |
| 5,664,167 | 9/1997 | Pickett et al. | 395/557 |

FOREIGN PATENT DOCUMENTS

| | | |
|---|---|---|
| 62-168231 | 7/1987 | Japan. |
| 6-131173 | 5/1994 | Japan. |

*Primary Examiner*—Alyssa H. Bowler
*Assistant Examiner*—Walter D. Davis, Jr.
*Attorney, Agent, or Firm*—Oliff & Berridge, PLC

[57] ABSTRACT

The present invention provides a program control system including plural programs, plural execution means each of which executes the corresponding program of the plural programs, a memory for storing the plural programs, plural program counters each of which generates an address for reading the corresponding one of the programs from the memory, and a selector for selecting an output of one of the program counters and providing the output to the memory. Each of the programs stored in the memory and executed by the corresponding one of the execution means is indicated by the address generated by the corresponding one of the program counters selected by the selector, and the memory sequentially stores instructions in each of the programs.

5 Claims, 5 Drawing Sheets

PROGRAM CONTROL SYSTEM PROGRAMMABLE TO SELECTIVELY EXECUTE A PLURALITY OF PROGRAMS

BACKGROUND OF THE INVENTION

1. Field of the Invention

The present invention relates to a program control system having execution means and a series of processes controlled by a program stored in an inside memory, that independently executes plural processes.

2. Discussion of the Related Art

FIG. 2 shows a basic construction of a general program control system, in which 11 is a program counter, 12 is a program memory, 13 is a decoder and 14 is an execution part. The system shown in FIG. 2 executes a single process (process number #1). The program counter 11 specifies a memory address of the program to be read and the program memory 12 stores the program. The contents of the program, namely, the instructions are indicated by #1-(1), #1-(2), #1-(3), . . . in FIG. 2. The decoder 13 decodes the instruction and converts it into a control signal. The execution part 14 carries out the process in accordance with the control signal. On completing execution of a single instruction, the execution part 14 inputs a completion signal to the program counter 11. The program counter 11 receives the completion signal from the execution part 14 and updates the memory address to set a next value.

In the system shown in FIG. 2, there is a single execution part 14 which carries out only a single process. Some systems have plural execution parts each of which carries out a corresponding process independently. In such a case, conventionally, the following methods have been suggested as program control systems for controlling all of the independent processes.

First is a method in which a whole system is provided to each and every process. FIG. 3 shows an example of a conventional program control system. In the figure, program counters are indicated by 21, 21-1, 21-2, . . . and 21-n, program memories are indicated by 22, 22-1, 22-2, . . . and 22-n, decoders are indicated by 23, 23-1, 23-2, . . . and 23-n, and execution parts are indicated by 24, 24-1, 24-2, . . . and 24-n. The construction shown in FIG. 3 is disclosed by, for example, Japanese Patent Application Unexamined Publication No. Sho. 62-168231 (1987).

Corresponding to n execution parts 24-1, 24-2, . . . and 24-n, the above construction has n program counters, n program memories and n program decoders. The i-th process is carried out by the program counter 21-i, the program memory 22-i, the decoder 23-i and the execution part 24-i (n and i are natural numbers, i≦n). Thus each process is carried out by the program counter, program memory, decoder and execution part of its own, the same as the system shown in FIG. 2. This means that all elements constituting the system are provided to each of the processes, and accordingly there occurs a problem that the size of the circuit is necessarily bulky.

Another method assigns a program which executes plural processes to decoders by time division. The example of this conventional program control system is illustrated in FIG. 4. In the figure, a program counter is indicated by 31, a program memory is indicated by 32, decoders are indicated by 33-1, 33-2, . . . and 33-n, execution parts are indicated by 34-1, 34-2, . . . and 34-n, and a sharing function part is indicated by 35. The construction shown in FIG. 4 is disclosed by, for example, Japanese Patent Application Unexamined Publication No. Hei. 6-131173 (1994).

In the method, the decoders 33-1, 33-2, . . . and 33-n and the execution parts 34-1, 34-2, . . . and 34-n are provided to each of the processes, and the program counter 31 and the program memory 32 are common to the execution parts 34-1, 34-2, . . . and 34-n. Each of the decoders 33-1, 33-2, and 33-n receives the instruction of each process read from the program memory 32 by time division. Because each of the processes is executed by time division, it is possible to share the function common to the processes which can be executed without keeping the status. The sharing function part 35 executes the process concerning such function common to every process. Since there is only one program memory 32 and the sharing function part 35 is shared, the circuit can be smaller in size in comparison with the method shown in FIG. 3.

FIGS. 5 and 6 illustrate examples of the order of operation of the execution part. There is a single program counter 31 in this method. Therefore, programs stored in the program memory 32 must be arranged according to the order of transferring to each of decoders 33-1, 33-2, . . . and 33-n. For example, let us suppose a case where one of n independent processes (the process number from #1 to #n) is alternately selected per every issuance of a single instruction and sequentially executed, as shown in FIG. 5. In this case, the first instruction of the process #1 must be firstly stored in the program memory 32, and the first instruction of the process #2 must be stored subsequent thereto. In the same way, after the first instruction of the process #n is stored, the second instructions of the processes #1 to #n are stored in order. Thereby the program counter 31 is able to fetch the programs in the order of arrangement of storing and sequentially transfer each of them to the decoders 33-1, 33-2, . . . and 33-n, respectively. Accordingly, each of the execution parts 34-1, 34-2, and 34-n can operate in the order shown in FIG. 5.

However, to make the execution parts operate as shown in FIG. 5 according to this method, it is necessary to edit the programs of the processes to generate a single program having the order as shown in the program memory 32 in FIG. 4. Re-edit of the program is also required if the pattern of switching the plural processes is desired to be changed, for example, if the switching per every single instruction as shown in FIG. 5 is desired to be changed to the switching per every two instructions as shown in FIG. 6. Moreover, re-instal of the program to the system is required such as exchange of the program memory storing the re-edited program, for example, a ROM, or down load of the program to the system. In the same way, if execution of only one process to confirm its operation is needed, for example, in a debugging process, it is necessary to edit and instal a debugging dedicated program.

SUMMARY OF THE INVENTION

The present invention has been made in view of the above circumstances and has as an object a program control system which does not require an edit of process programs to make a single program in execution of plural independent processes, and no re-edit or re-instal of programs when a change of switching patterns among processes is required, and does not enlarge the size of the circuit.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a program control system of the present invention comprises plural programs, plural execution means each of which executes the corresponding program of the plural programs, a memory for storing the plural programs, plural program counters each of which generates an address for reading the corresponding one of the programs from the memory, and a selector for selecting an output of one of the program counters and providing the output to the memory. Each of the programs stored in the memory and executed by the corresponding one of the execution means is indicated by the address generated by the corresponding one of the program counters selected by the selector, and the memory sequentially stores instructions in each of the programs.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENT

A preferred embodiment of a program control system according to the present invention is now described in detail based on the drawings. In the embodiment, a series of instructions constituting a program is consecutively stored in a memory.

First Embodiment

Figure 1:
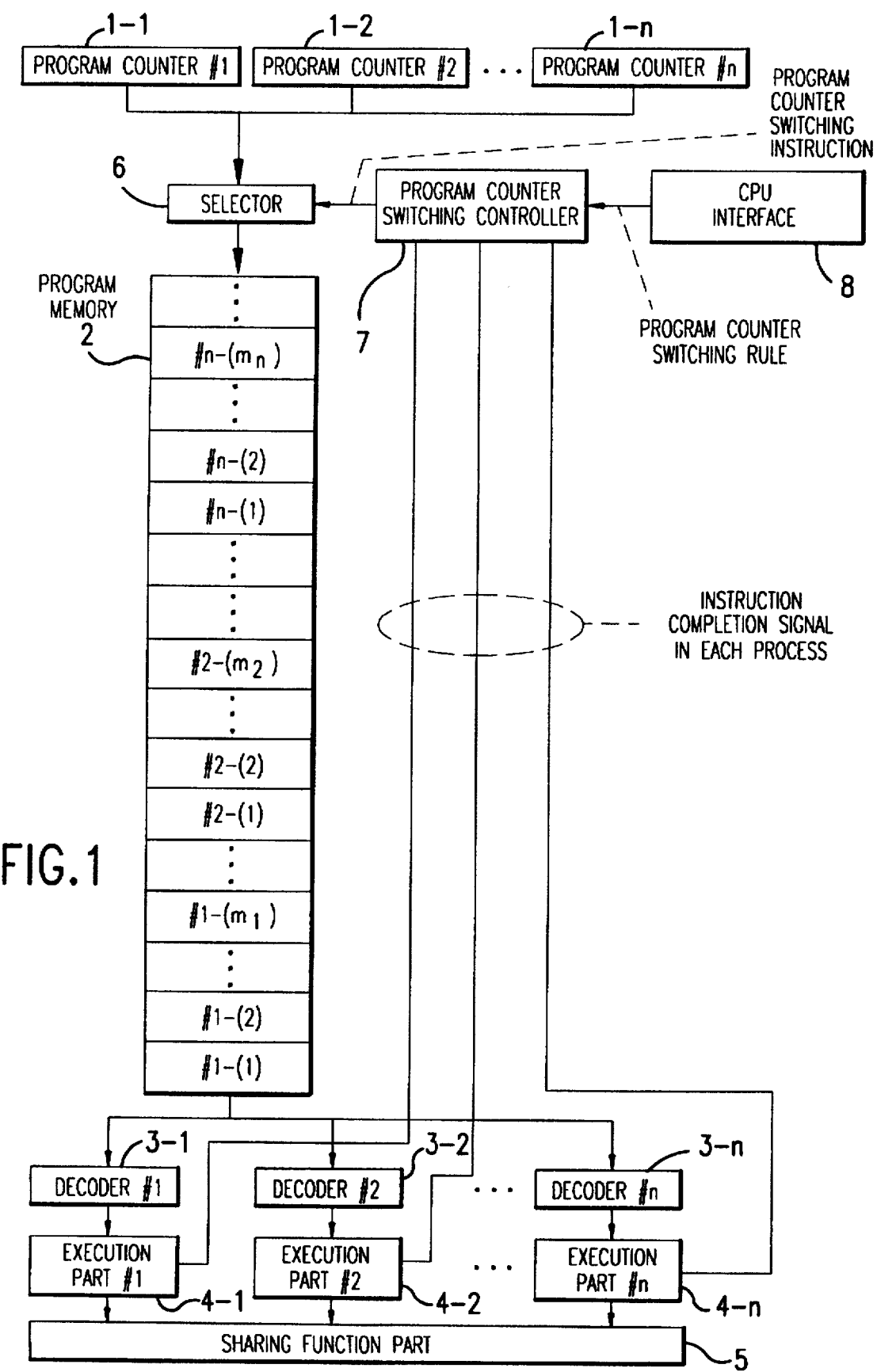
FIG. 1 shows a construction of an embodiment of a program control system according to the present invention.
Figure 2:
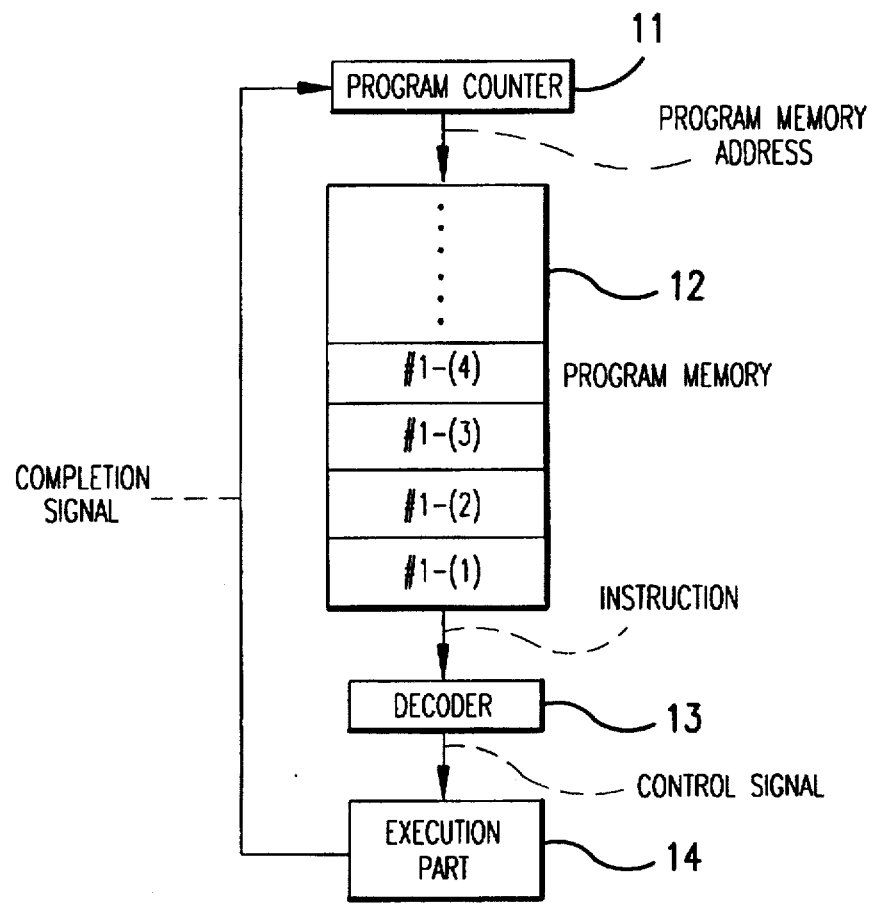
FIG. 2 shows a basic construction of a general program control system.
Figure 3:
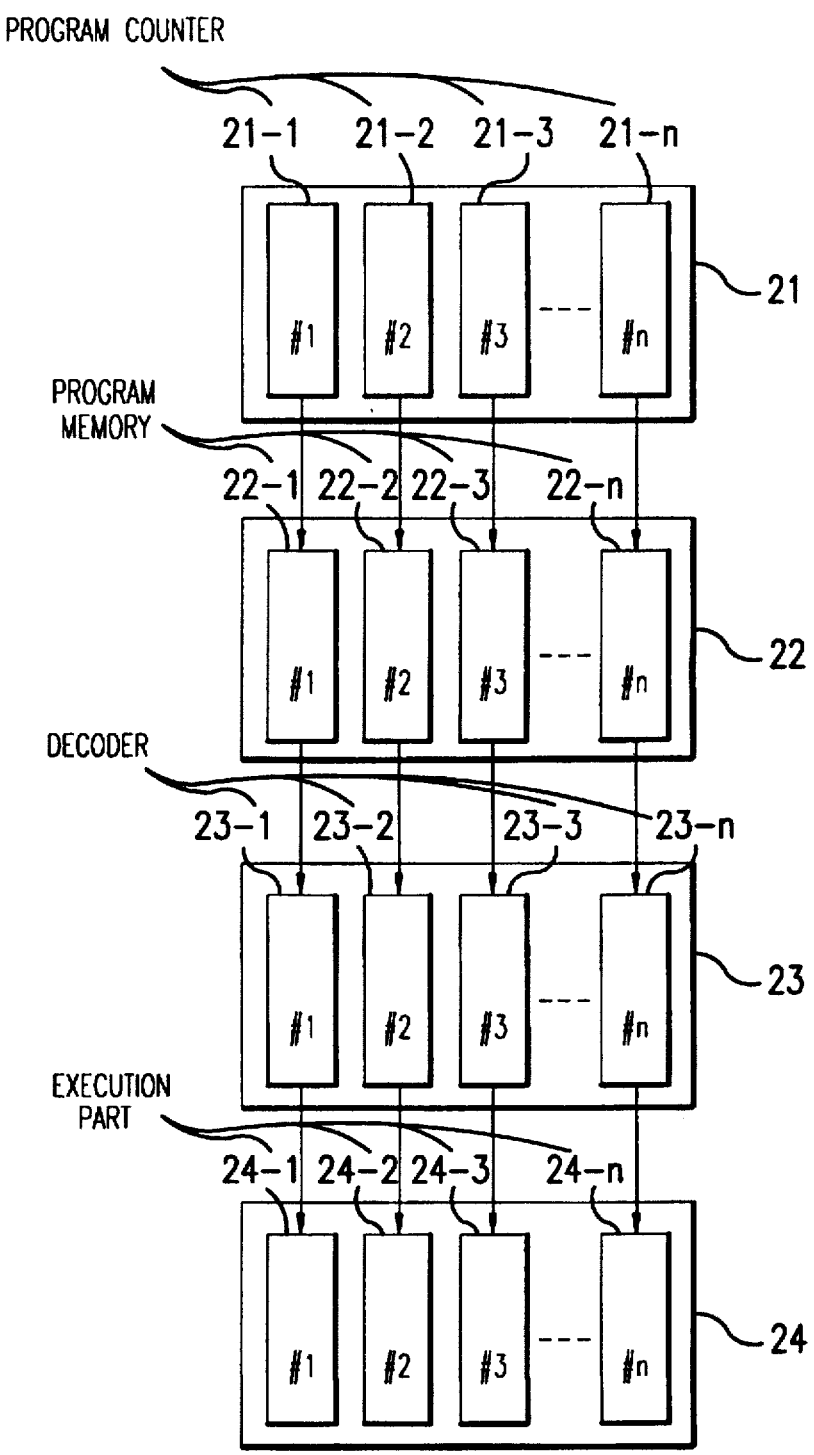
FIG. 3 illustrates an example of a conventional program control system.
Figure 4:
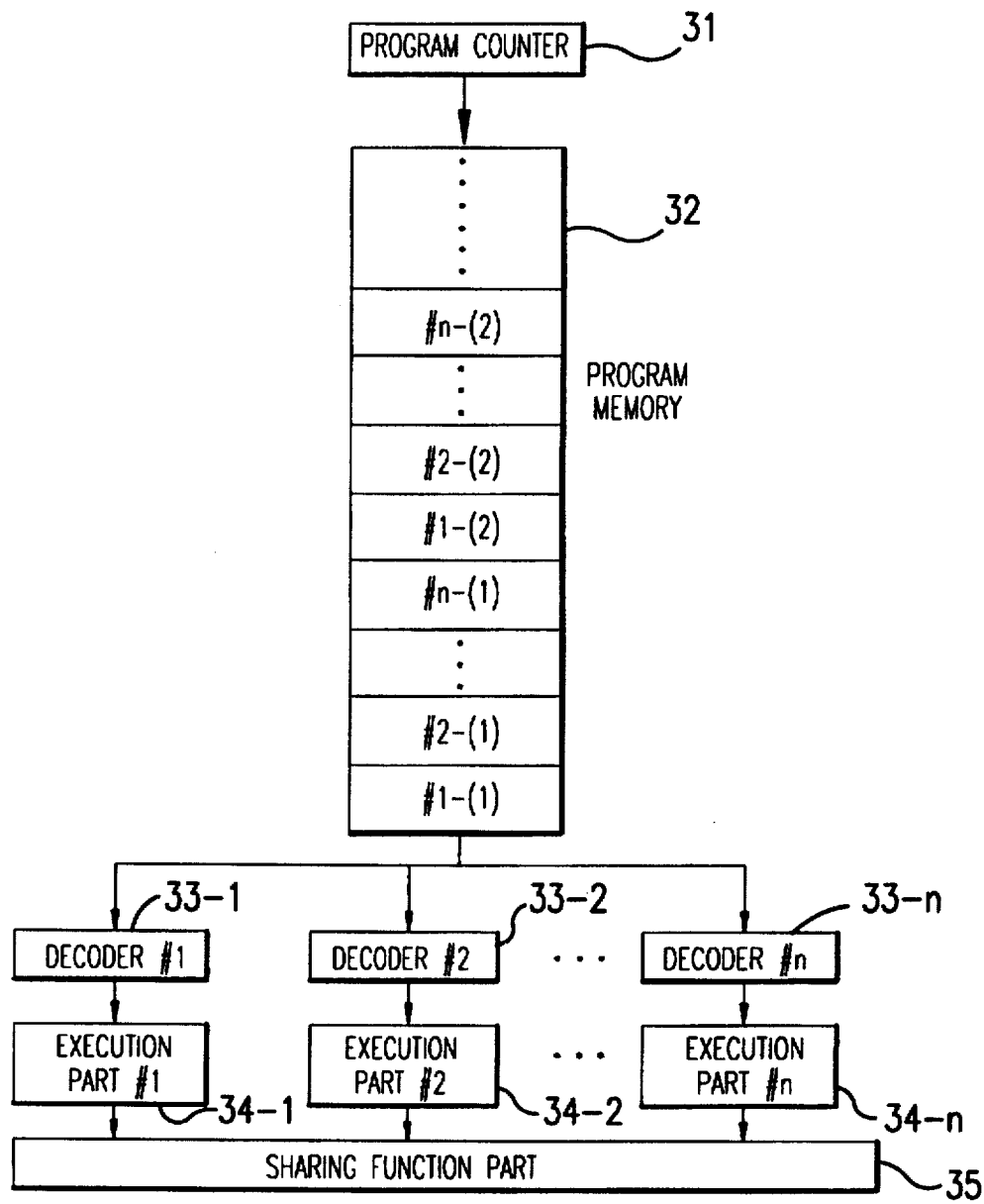
FIG. 4 illustrates another example of the conventional program control system.

FIG. 1 shows a construction of an embodiment of a program control system according to the present invention. In the figure, program counters are indicated by 1-1 to 1-n, a program memory is indicated by 2, decoders are indicated by 3-1 to 3-n, execution parts are indicated by 4-1 to 4-n, a sharing function part is indicated by 5, a selector is indicated by 6, a program counter switching controller is indicated by 7 and a CPU interface part is indicated by 8.

The program control system has n execution parts 4-1 to 4-n (n is a natural number) which execute the independent processes. The program counters 1-1 to 1-n are provided corresponding to the execution parts 4-1 to 4-n, each of which specifies a program stored in the program memory 2 to be executed by each of the execution parts 4-1 to 4-n. In the program memory 2, plural programs are stored for every process. Each of the decoders 3-1 to 3-n is provided to each process, respectively, to convert the instruction output from the program memory 2 into the control signal. The execution parts 4-1 to 4-n execute processes in accordance with the control signals output from the corresponding decoders 3-1 to 3-n, and transfer the instruction completion signals to the program counter switching controller 7 after completion of the processes. The sharing function part 5 executes the process concerning the function necessary in common to each of the processes.

The selector 6 selects one of the outputs from the plural program counters 1-1 to 1-n and provides it to the program memory 2. Based on a program counter switching rule, the program counter switching controller 7 controls switching of the program counters 1-1 to 1-n carried out by the selector 6 in accordance with the instruction completion signal from each of the execution parts 4-1 to 4-n. The CPU interface part 8 provides the program counter switching rule specified by, for example, external CPU to the program counter switching controller 7.

An example of operation of an embodiment of the program control system according to the present invention is described as follows. First, an external CPU or the like inputs the program counter switching rule to the CPU interface part 8. The CPU interface part 8 transfers the input program counter switching rule to the program counter switching controller 7. On receiving the program counter switching rule, the program counter switching controller 7 provides instruction of switching of the program counters to the selector 6 in accordance with the instruction completion signal from each of the execution parts 4-1 to 4-n. The selector 6 receives the instruction of switching of the program counters and selects one of the outputs from the plural program counters 1-1 to 1-n according to the instruction, and provides it as an address to the program memory 2. In the program memory 2, the program of each process is located to a memory address indicated by the output of each of the program counters 1-1 to 1-n, not located to another memory address indicated by the output of another program counter. Therefore, a program of the process corresponding to the selected program counter is read from the program memory 2. For example, if the selector 6 selects i-th program counter, namely, the program counter 1-i, the output of the program counter 1-i is provided to the program memory 2, and then one of the programs of the process #1 is output from the program memory 2.

Each of the decoders 3-1 to 3-n executes decoding of the instruction output from the program memory 2. If the decoded instruction is interpreted as an execution instruction for the process of the execution part corresponding to the decoder, a control signal corresponding to the instruction is output to the execution part. On the other hand, if the decoded instruction is interpreted as an execution instruction for the process of another execution part, nothing is output. Each of the execution parts 4-1 to 4-n executes the process in accordance with the control signal from each of the decoders 3-1 to 3-n corresponding thereto. In execution, the sharing function part 5 is used if necessary. After completion of the processes, the instruction completion signal is input to the program counter switching controller 7.

Only the program counter selected by the selector 6 is incremented with the receiving timing of the instruction completion signal from the execution signal.

As described above, the current program control system executes the plural processes by time division by switching the program counters 1-1 to 1-n.

Figure 5:
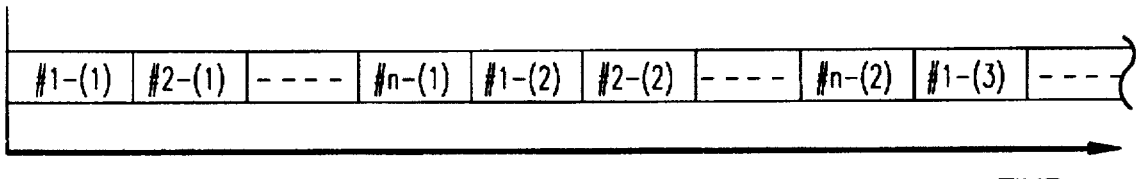
FIG. 5 illustrates an example of the operation order of execution parts.

The above-described operation is now explained using a concrete example. Here, a case of sequentially executing the instructions of each process one by one, as shown in FIG. 5, is taken as an example. First, the program counter switching rule is input from the external CPU or the like to the program counter switching controller 7 through the CPU interface part 8. In this example, a program counter switching rule to the effect that program counters are sequentially switched per every input of a single instruction is input. In the following description, it is assumed that the input program counter switching rule is represented by the ratio of the number of instructions of each of the processes. That is, the program counter switching rule "#1 :#2:#3: . . . :#n=1:1:1: . . . 1" is input here.

On receiving the program counter switching rule, the program counter switching controller 7 provides the program counter switching instruction to the selector 6 so as to first select the program counter 1-1. The selector 6 receives the program counter switching instruction, and according thereto, selects the output from the program counter 1-1 to provide it as an address to the program memory 2. At this time, if the output of the program counter 1-1 addresses the instruction #1-(1) in the program memory 2 shown in FIG. 1, the instruction #1-(1) is read from the program memory 2 and input to the decoders 3-1 to 3-n. The decoder 3-1 decodes the instruction #1-(1) to generate the control signal, and outputs the signal to the execution part 4-1. The execution part 4-1 carries out the process in accordance with the control signal. In carrying out the process, the sharing function part 5 is used if necessary. As the process is completed, the process completion signal is transferred to the program counter switching controller 7.

On receiving the process completion signal from the execution part 4-1, the program counter switching controller 7 provides the program counter switching instruction to the selector 6 to select the program counter 1-2. In accordance with the instruction, the selector 6 selects the output of the program counter 1-2 and provides it as an address to the program memory 2. Because the top address of the program to be executed by the execution part 4-2 is set to the program counter 1-2, the instruction #2-(1) is read and decoded by the decoder 3-2 to generate the control signal. The control signal is output to the execution part 4-2, where the process according to the control signal is executed. When the process is completed, the instruction completion signal is input to the program counter switching controller 7.

In the same way, on every input of the instruction completion signal from the execution part 4-1 to the program counter switching controller 7, the program counter switching controller 7 provides the program counter switching instruction to the selector 6 and the program counters 1-1 to 1-n are sequentially selected, thus resulting in sequential execution of the processes in the execution parts 4-1 to 4-n. The program counters 1-1 to 1-n are constructed so as to address the next instruction on every execution of the addressed instruction. After sequential selection of the program counters 1-1 to 1-n and execution of the instructions #1-(1) to #n-(1), the program counter 1-1 is selected again and the next instruction #1-(2) is executed, and then the instructions #2-(2), . . . #n-(m $_n$) are sequentially executed.

Figure 6:
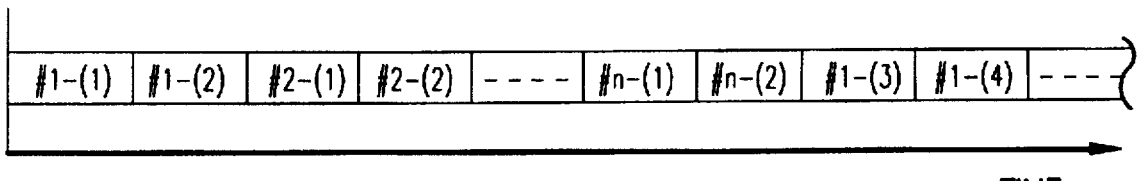
FIG. 6 illustrates another example of the operation order of the execution parts.

Next, let us suppose the case where the switching pattern of processes is desired to be changed so that processes are sequentially executed per every two instructions as shown in FIG. 6. In this case, the program counter switching rule "#1:#2:#3:#n=2:2:2:2" is input to the program counter switching controller 7. The program counter switching controller 7 provides the program counter switching instruction to the selector 6 so as to first select the output of the program counter 1-1. Thereby the execution part 4-1 executes the instruction #1-(1). On receiving the instruction completion signal from the execution part 4-1, the program counter switching controller 7 counts the instruction completion signal by an inside counter, but does not provide the program counter switching instruction at this moment. Then the program counter 1-1 outputs the address of the next instruction to the program memory 2 and the execution part 4-1 executes the instruction #1-(2). On receiving the second instruction completion signal from the execution part 4-1, the program counter switching controller 7 provides the program counter switching instruction to the selector 6 for switching so as to select the output of the program counter 1-2, whereby the execution part 4-2 operates on two instructions. Similarly, the execution parts 4-3 to 4-n also operates on every two instructions, and such operations are repeated.

Figure 7:
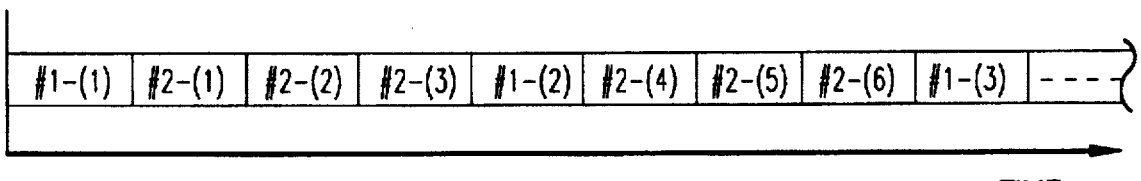
FIG. 7 illustrates a third example of the operation order of the execution parts.
Figure 8:
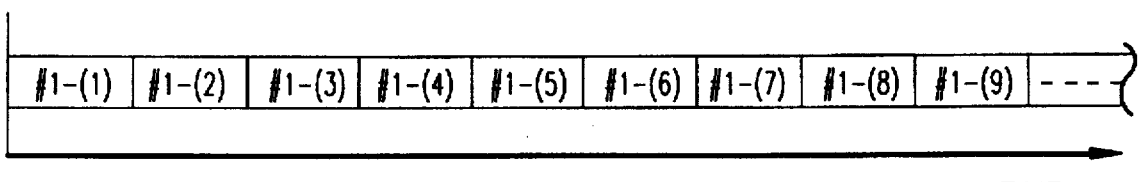
FIG. 8 illustrates a further example of the operation order of the execution parts.

As described above, according to the provision of the program counter switching rule, the time assigned to a single process can be set arbitrarily. FIGS. 7 and 8 show other examples of the operation order of the execution parts. The example shown in FIG. 7 illustrates the case where only the processes of the execution parts 4-1 and 4-2 are executed with the ratio of 1:3. The program counter switching rule "#1:#2:#3. . . :#n =1:3:0:0:" is input to the program counter switching controller 7 in this case, and the program counter switching controller 7 provides the program counter switching instruction to the selector 6 so that the selector 6 may not select the output of the program counter having the ratio 0. The use of such program counter switching rule enables the arbitrary setting of selection of the process to be executed and the operation ratio of the processes.

Further, as shown in FIG. 8, if sequential execution of only one process is desired, for example, if sequential execution of the execution part 4-1 is desired, it can be realized by providing the program counter switching rule "#1:#2:#3:. . . #n =1:0:0:" to the program counter switching controller 7. It is effective in the case where the operation of only one process is confirmed, such as debugging.

As described so far, the mere change of the program counter switching rule provided to the program counter switching controller 7 can change the selection of the execution parts or operation ratio of the processes. Moreover, it is unnecessary to re-edit the program stored in the program memory 2, or to re-instal the program at that time. The changing operation of the program counter switching rule such as described above can be implemented by specification in the CPU, for example, and accordingly, changing during the operation of the system is also possible. For instance, it is possible to watch the instruction from the external interface or status of operation of the execution parts 4-1 to 4-n, and to generate the program counter switching rule seeking for the optimal operation ratio.

The above program counter switching rule can specify whether each of the execution parts 4-1 to 4-n operates or not and the operation ratio, but the embodiment is not limited thereto and various specifications are possible. For example, the system having a construction in which the selection order of the program counters 1-1 to 1-n can be specified is available. The format of the program counter switching rule is not limited to the one described above.

In FIGS. 5 and 6, the numeric value subsequent to #in #1-(1), for example, represents the process, or the program counter number, and the parenthesized numeric value indicates the instruction number of the instruction to be executed. Therefore, to be more concrete, specification of the selection order can be made by specifying the numeric value subsequent to #, and the operation ratio can be specified by changing the number of repeated occurrence of the parenthesized numeric value for the same process or program counter number, namely, the numeric value subsequent to #.

With the above construction of the embodiment, in a system such that the program counter switching rule is determined in advance, the CPU interface part 8 is unnecessary. As shown in FIGS. 5 and 6, if switching of the program counters 1-1 to 1-n is carried out only in accordance with a specific pattern, the system can be constructed so that switching is carried out by directly inputting the instruction completion signal to the selector 6 without mounting the program counter switching controller 7. Furthermore, the sharing function part 5 is not always indispensable.

In the above description, each of the execution parts 4-1 to 4-n operates by time division, but it is also possible, for example, to operate the execution parts in parallel. In such a case, the program counter switching controller 7 receives the instruction completion signal from each of the execution parts 4-1 to 4-n, and is able to provide the program counter switching instruction to the selector 6 to select the output of the program counter corresponding to the execution part which sent the the instruction completion signal. Thereby the execution parts can provide the next instruction in the order of completion of the process for proceeding with subsequent processes.

The application example of the above-described program control system can apply to the communication terminal. For instance, it is assumed that the process executed by the execution part 4-1 is a transmitting process and the process executed by the execution part 4-2 is a receiving process. In transmitting the application data and in receiving thereof, both of the transmitting process and the receiving process are necessary for protocol processing such as flow control. However, the ratio of execution of transmitting process becomes higher in transmitting the application data, and on the contrary, the ratio of execution of receiving process is higher in receiving the application data. In this case, application of the program control system described above enables the effective control of processes by differentiating the program counter switching rule in transmitting the application data from that in receiving the application data to change the operation ratio of the transmitting process and the receiving process.

In the above embodiment, all the numbers of program counters, programs stored in the program memory 2, decoders and execution parts are same, but the numbers of decoders and execution parts can be larger than those of program counters and programs stored in the program memory 2, which shows the possibility that the plural execution parts are controlled by a single program. For example, in the case of applying the program control system of the present invention to the communication device utilizing the Asynchronous Transfer Mode (ATM) communication network, there are some cases where switching of destination itself is carried out by the hardware in the switching device of the ATM by examining the header of the transmission data, and only one program is sufficient for controlling the hardware.

The foregoing description of a preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A program control system for controlling simultaneous execution of a plurality of programs, the system comprising:

a plurality of program executors each of which executes the corresponding program of said plurality of programs;

a memory for storing said plurality of programs;

a plurality of program counters each of which generates an address for reading the corresponding one of said programs from said memory;

a selector for selecting an output of one of said program counters and providing said output to said memory;

wherein each of said programs are stored in said memory and are executed by the corresponding one of said program executors indicated by said address generated by the corresponding one of said program counters selected by said selector;

wherein said memory sequentially stores instructions from each of said programs; and a program counter switching controller that is programmable with a program counter switching rule and which controls selection of said program counters by said selector in accordance with said program counter switching rule, wherein said program counter switching rule specifies which of said plurality of program counters said selector will select and the number of times each of said selected program counters will be repetitively selected in succession by said selector.

2. The program control system according to claim 1, wherein the number of said plurality of program executors, said plurality of program counters and said plurality of programs stored in said memory are equal.

3. The program control system according to claim 1, wherein said plurality of program executors have a sharing function executor for executing a common process of said plurality of processes each of which is executed by the corresponding one of said plurality of program executors.

4. The program control system according to claim 1, wherein said program counter switching controller detects completion of execution by one of said plurality of program executors.

5. The program control system according to claim 1, wherein said predetermined switching rule prescribes the order of selection of said program counters by said selector.

* * * * *